(12) United States Patent
Saiga et al.

(10) Patent No.: US 10,676,628 B2
(45) Date of Patent: Jun. 9, 2020

(54) SURFACE TREATMENT LIQUID COMPOSITION FOR SUBSTRATE, INK SET, RECORDING METHOD, RECORDING DEVICE, STORAGE CONTAINER, AND PRINTED MATTER

(71) Applicants: Takuya Saiga, Shizuoka (JP); Satoyuki Sekiguchi, Kanagawa (JP); Ryo Miyakoshi, Kanagawa (JP); Daisuke Asahina, Kanagawa (JP)

(72) Inventors: Takuya Saiga, Shizuoka (JP); Satoyuki Sekiguchi, Kanagawa (JP); Ryo Miyakoshi, Kanagawa (JP); Daisuke Asahina, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 288 days.

(21) Appl. No.: 15/594,744

(22) Filed: May 15, 2017

(65) Prior Publication Data

US 2017/0355868 A1 Dec. 14, 2017

(30) Foreign Application Priority Data

Jun. 8, 2016 (JP) .................................. 2016-114533
Mar. 13, 2017 (JP) .................................. 2017-047543

(51) Int. Cl.
| C09D 11/38 | (2014.01) |
| C09D 11/322 | (2014.01) |
| C09D 11/54 | (2014.01) |
| C09D 11/40 | (2014.01) |
| B41M 5/00 | (2006.01) |

(52) U.S. Cl.
CPC ........... *C09D 11/38* (2013.01); *B41M 5/0017* (2013.01); *C09D 11/322* (2013.01); *C09D 11/40* (2013.01); *C09D 11/54* (2013.01); *B41M 5/0064* (2013.01)

(58) Field of Classification Search
None
See application file for complete search history.

(56) References Cited

U.S. PATENT DOCUMENTS

| 2,484,430 | A | * | 10/1949 | Sprague | .................... | C08F 8/00 430/941 |
| 2,548,564 | A | * | 4/1951 | Sprague | .................. | G03C 1/835 430/213 |
| 3,148,061 | A | * | 9/1964 | Haas | ........................ | G03C 8/56 101/464 |
| 4,115,124 | A | * | 9/1978 | Hamilton | ................ | G03C 1/053 430/220 |
| 4,124,386 | A | * | 11/1978 | Yoshida | ................... | G03C 8/56 430/213 |
| 4,193,800 | A | * | 3/1980 | Iwama | ..................... | G03C 8/56 428/509 |
| 4,273,853 | A | * | 6/1981 | Ponticello | ................ | G03C 8/56 430/213 |
| 4,282,305 | A | * | 8/1981 | Brust | ........................ | G03C 8/00 430/213 |
| 4,450,224 | A | * | 5/1984 | Klein | ........................ | G03C 8/56 428/522 |
| 6,096,469 | A | * | 8/2000 | Anderson | ................ | B41M 5/52 423/335 |
| 6,455,133 | B1 | * | 9/2002 | Furukawa | .............. | B41M 5/508 428/32.18 |
| 6,465,078 | B1 | * | 10/2002 | Kawai | .................. | B41M 5/5245 428/32.26 |
| 6,656,544 | B1 | * | 12/2003 | Ishikawa | .............. | B41M 5/5254 428/32.1 |
| 2001/0023049 | A1 | * | 9/2001 | Yasuda | .............. | G03C 1/49863 430/138 |
| 2002/0060727 | A1 | * | 5/2002 | Nishita | ................ | B41M 5/0017 347/100 |
| 2002/0150732 | A1 | * | 10/2002 | Sarkar | .................. | B41M 5/5245 428/195.1 |
| 2002/0160162 | A1 | * | 10/2002 | Kawai | .................. | B41M 5/5245 428/32.3 |
| 2003/0230967 | A1 | * | 12/2003 | Kawamura | ............ | B41M 3/006 313/483 |
| 2004/0214919 | A1 | * | 10/2004 | Ikeda | ...................... | C09D 11/16 523/160 |
| 2005/0120911 | A1 | * | 6/2005 | Huber | .................. | C07D 209/48 106/31.49 |
| 2010/0328957 | A1 | * | 12/2010 | Hessing | ................ | B41M 5/502 362/311.01 |
| 2013/0194356 | A1 | * | 8/2013 | Hoff | ....................... | B41J 2/1754 347/86 |
| 2013/0331486 | A1 | * | 12/2013 | Kasahara | ............. | C09D 11/322 524/90 |

* cited by examiner

FOREIGN PATENT DOCUMENTS

| JP | 2006-265516 | 10/2006 |
| JP | 2010-247469 | 11/2010 |

*Primary Examiner* — Peter A Salamon
(74) *Attorney, Agent, or Firm* — Oblon, McClelland, Maier & Neustadt, L.L.P.

(57) ABSTRACT

A surface treatment liquid composition for a substrate is provided. The surface treatment liquid composition includes a water-soluble salt, water, and a resin particle including a resin having a structural unit represented by the following formula (1):

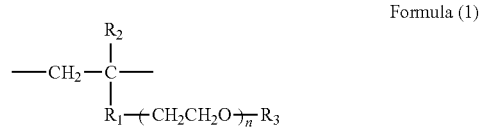

Formula (1)

where $R_1$ represents —COO—; each of $R_2$ and $R_3$ independently represents a hydrogen atom or an alkyl group having 1 to 4 carbon atoms; and n represents an integer of from 5 to 100.

20 Claims, 3 Drawing Sheets

US 10,676,628 B2

SURFACE TREATMENT LIQUID COMPOSITION FOR SUBSTRATE, INK SET, RECORDING METHOD, RECORDING DEVICE, STORAGE CONTAINER, AND PRINTED MATTER

CROSS-REFERENCE TO RELATED APPLICATIONS

This patent application is based on and claims priority pursuant to 35 U.S.C. § 119(a) to Japanese Patent Application No. 2016-114533 and 2017-047543, filed on Jun. 8, 2016 and Mar. 13, 2017, respectively, in the Japan Patent Office, the entire disclosure of each of which is hereby incorporated by reference herein.

BACKGROUND

Technical Field

The present disclosure relates to a surface treatment liquid composition for a substrate, an ink set, a recording method, a recording device, a storage container, and printed matter.

Description of the Related Art

Inkjet printers are now widely used at home as the output device of digital signals since they are relatively quiet, enjoy low running costs, and are capable of easily printing color images.

Conventionally, absorptive media, such as plain papers, have been widely used as printing media. Lately, printing media are more diversified. For example, coated papers that have a low absorptivity to commercial-printing inks and plastic films (e.g., food packing materials) that have no absorptivity to inks are used as printing media in inkjet recording. Such media are required to provide the same degree of image quality and printing speed as conventional printing media.

However, since such low-absorptive or non-absorptive media do not allow ink droplets impacted thereon to permeate, the ink droplets are very likely to aggregate in a solid image portion and cause density unevenness (this phenomenon is called "beading").

SUMMARY

In accordance with some embodiments of the present invention, a surface treatment liquid composition for a substrate is provided. The surface treatment liquid composition includes a water-soluble salt, water, and a resin particle including a resin having a structural unit represented by the following formula (1):

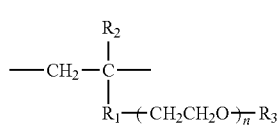

Formula (1)

where $R_1$ represents —COO—; each of $R_2$ and $R_3$ independently represents a hydrogen atom or an alkyl group having 1 to 4 carbon atoms; and n represents an integer of from 5 to 100.

In accordance with some embodiments of the present invention, an ink set is provided. The ink set includes the above surface treatment liquid composition and an ink including a colorant and a resin particle for ink.

In accordance with some embodiments of the present invention, a recording method is provided. The recording method includes applying a surface treatment liquid composition onto a substrate and applying an ink onto the surface treatment liquid composition applied onto the substrate. The surface treatment liquid composition and the ink used in this recording method are included in the above ink set.

In accordance with some embodiments of the present invention, a recording device is provided. The recording device includes a surface treatment liquid composition applicator and an ink applicator. The surface treatment liquid composition applicator is configured to apply a surface treatment liquid composition onto a substrate. The ink applicator is configured to apply an ink onto the surface treatment liquid composition applied onto the substrate. The surface treatment liquid composition and the ink used in this recording device are included in the above ink set.

In accordance with some embodiments of the present invention, a storage container is provided. The storage container includes a container and the above surface treatment liquid composition stored in the container.

In accordance with some embodiments of the present invention, printed matter is provided. The printed matter includes a substrate onto which the above surface treatment liquid composition is applied and an image formed with the ink on the substrate.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
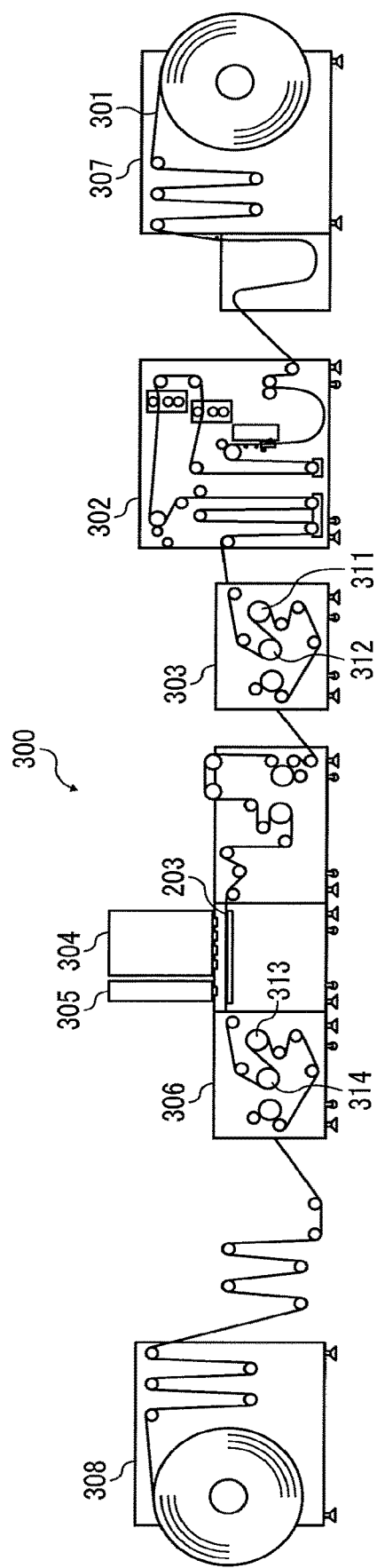
FIG. 1 is a schematic view of a recording device according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In attempting to suppress the occurrence of beading, one technique has been proposed that forms a coating on a surface of a medium with an aggregating-agent-containing pretreatment liquid. Ink is impacted on the coated portion of the medium. This technique is known to suppress the occurrence of beading as the aggregating agent in the pretreatment liquid fixes resin particles and colorants in the ink and thus suppresses the colorants from migrating. The aggregating agent in the pretreatment liquid is generally a water-soluble salt, such as a polyvalent metal salt, that has a strong ability of aggregating resin particles and colorants dispersed by charge repulsion.

However, when the water-soluble salt is present in the pretreatment liquid, resin particles included in the pretreatment liquid, serving as a binder for fixing the colorants to media, are caused to aggregate (salt out). Thus, it is difficult for the pretreatment liquid to maintain storage stability.

The coating of the pretreatment liquid is further required to have water resistance so as not to dissolve upon impact of ink droplets thereon.

Accordingly, in high-speed printing systems that use low-ink-absorptive media, the pretreatment liquid is required to have beading suppressing effect, water resistance, and storage stability at the same time.

In view of this situation, one object of the present invention is to provide a surface treatment liquid composition for a substrate that has high degrees of beading suppressing effect, water resistance, and storage stability for an extended period of time.

In accordance with some embodiments of the present invention, a surface treatment liquid composition for a substrate is provided that has high degrees of beading suppressing effect, water resistance, and storage stability for an extended period of time.

The surface treatment liquid composition may be used for a recording method including: an application process for applying the surface treatment liquid composition to a substrate; and an ink discharge process for discharging an ink containing a colorant and a resin particle from nozzles to the surface treatment liquid composition that has been dried. The surface treatment liquid composition aggregates the colorant and the resin particle included in the ink.

Surface Treatment Liquid Composition for Substrate

The surface treatment liquid composition (hereinafter also referred to as "pretreatment liquid") for a substrate according to an embodiment of the present invention includes a water-soluble salt, water, and a resin particle including a resin having a structural unit represented by the following formula (1).

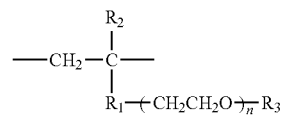

Formula (1)

In the formula (1), $R_1$ represents —COO—, each of $R_2$ and $R_3$ independently represents a hydrogen atom or an alkyl group having 1 to 4 carbon atoms, and n represents an integer of from 5 to 100.

Each composition of the pretreatment liquid is described in detail below.

Resin Particle

For the purpose of maintaining storage stability of the resin particle for an extended period of time even in the presence of a water-soluble salt, a side chain having a nonionic hydrophilic site represented by the formula (1) is introduced to the main chain of the molecular structure of the resin particle. Owing to such a molecular structure, the resin particle exerts a steric repulsion even in a charge repulsive emulsion. Therefore, the resin particle can maintain a good level of storage stability even in the presence of a water-soluble salt that has salting-out effect.

In the present disclosure, the resin particle refers to a fine resin seed obtained by an emulsion polymerization performed by a polymerizable monofunctional monomer, an emulsifier, a polymerization initiator, and/or a cross-linker.

The resin particle includes the resin having the structural unit represented by the following formula (1). This structural unit generates a steric repulsion, and therefore the resin particle can maintain a high degree of storage stability even in the presence of a water-soluble salt. In the formula (1), $R_1$ represents —COO— and each of $R_2$ and $R_3$ independently represents a hydrogen atom or an alkyl group having 1 to 4 carbon atoms. Preferably, $R_3$ is methyl group, for more improving storage stability. Preferably, $R_2$ is a hydrogen atom or methyl group. More preferably, $R_2$ is methyl group.

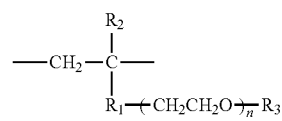

Formula (1)

In the formula (1), $R_1$ represents —COO—, each of $R_2$ and $R_3$ independently represents a hydrogen atom or an alkyl group having 1 to 4 carbon atoms, and n represents an integer of from 5 to 100.

In the formula (1), n represents an integer of from 5 to 100, preferably, from 10 to 50. When n is less than 5, the steric repulsion generated by the structural unit represented by the formula (1) becomes insufficient. As a result, the resin particle will easily aggregate by the action of salts present in the pretreatment liquid, resulting in deterioration of storage stability of the resin particle. When n is in excess of 100, the resin particle is increased in hydrophilicity, and therefore the coating film of the pretreatment liquid is decreased in water resistance.

Other than the structural unit represented by the formula (1), the resin particle may have another structural unit that is derived from any resin copolymerizable with the structural unit represented by the formula (1). Specific examples of such a resin include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins. Each of these resins can be used alone or in combination with others.

Preferably, the resin particle includes at least one of an acrylic resin, an urethane resin, and a polyester resin. In this case, the resin particle is easy to control the glass transition temperature and provides excellent dispersion stability and abrasion resistance.

Preferably, the resin particle further includes a monomer unit derived from a monomer and a cross-linked unit derived from a cross-linker, and a mass ratio of the structural unit represented by the formula (1) to a total mass (i.e., 100% by mass) of the monomer unit and the cross-linked unit is in the range of from 1% to 20% by mass, more preferably from 2% to 15% by mass, and most preferably from 4% to 10% by mass. When the mass ratio of the structural unit represented by the formula (1) is 1% by mass or more, storage stability of the resin particle is increased owing to a steric repulsion generated by the structural unit represented by the formula (1). When the mass ratio of the structural unit represented by the formula (1) is 20% by mass or less, water resistance of the resin particle is improved.

Preferably, a content rate of the structural unit represented by the formula (1) in the resin particle is in the range of from 8% to 20% by mass when n (i.e., the number of repeating unit) ranges from 5 to 10; from 4% to 10% by mass when n ranges from 11 to 40; and from 1% to 8% by mass when n ranges from 41 to 100. In these cases, both storage stability of the resin particle and water resistance of the coating film are achieved at the same time.

The resin particle may include a cross-linked structure. The resin particle having a cross-linked structure may be obtained by using a cross-linker when producing the resin particle. Examples of the cross-linker include ethylenic unsaturated compounds. Specific examples of the ethylenic unsaturated compounds include, but are not limited to, hydrolyzable-alkoxysilyl-group-containing ethylenic unsaturated compounds (e.g., vinyl trimethoxysilane, vinyl methyl dimethoxysilane, vinyl dimethyl methoxysilane, vinyl triethoxysilane, vinyl (2-methoxyethoxy)silane, vinyl triacetoxysilane) and polyfunctional vinyl compounds (e.g., divinylbenzene, diallyl phthalate).

When the resin particle is produced, an emulsifier may be used. The emulsifier is not limited to a specific material. Specific examples of commercially-available emulsifiers include, but are not limited to, SE-10N (available from ADEKA CORPORATION), NE-10 (available from ADEKA CORPORATION), NE-20 (available from ADEKA CORPORATION), NE-30 (available from ADEKA CORPORATION), ADEKA REASOAP SR-10 (available from ADEKA CORPORATION), ADEKA REASOAP SR-20 (available from ADEKA CORPORATION), ADEKA REASOAP ER-20 (available from ADEKA CORPORATION), AKUARON RN-10 (available from DKS Co., Ltd.), AKUARON RN-20 (available from DKS Co., Ltd.), AKUARON RN-50 (available from DKS Co., Ltd.), AKUARON HS-10 (available from DKS Co., Ltd.), AKUARON KH-05 (available from DKS Co., Ltd.), AKUARON KH-10 (available from DKS Co., Ltd.), ELEMINOL JS-2 (available from Sanyo Chemical Industries, Ltd.), and LATEMUL S-180 (available from Kao Corporation). Each of these materials can be used alone or in combination with others.

When the resin particle is produced, a polymerization initiator may be used. Specific examples of the polymerization initiator include, but are not limited to: ammonium persulfate; potassium persulfate; hydrogen peroxide; peroxides such as tert-butyl hydroxy peroxide; redox initiators combining the peroxides, metal ions, and reducing agents; and azo compounds such as 2,2'-azobisisobutyronitrile.

Preferably, the polymerization reaction is performed in an inert gas (e.g., nitrogen gas) atmosphere. Each of the above polymerization initiators can be use alone or in combination with others.

The presence of the resin having the structural unit represented by the formula (1) in the resin particle, as well as the content of the structural unit represented by the formula (1) in the resin particle, can be determined by analyzing the molecular structure of the resin particle by $^{13}$C-NMR (nuclear magnetic resonance), $^{1}$H-NMR, and/or pyrolysis GC/MS (gas chromatography and mass spectroscopy).

Alternatively, the content of the structural unit represented by the formula (1) can be determined from the amounts of raw materials used for producing the resin particle, if such data is available.

The resin particle including the resin having the structural unit represented by the formula (1) may be produced by, for example, preparing an emulsified liquid by stir-mixing a monomer that becomes the structural unit represented by the formula (1), other monomers that become other structural units, a cross-linker, an emulsifier, etc., and pouring the emulsified liquid into an aqueous phase containing a polymerization initiator to cause an emulsion polymerization.

Specific examples of the monomer that becomes the structural unit represented by the formula (1) include, but are not limited to, polyethylene glycol (n=5-100) monomethacrylate, methoxypolyethylene glycol (n=5-100) monomethacrylate, ethoxypolyethylene glycol (n=5-100) monomethacrylate, polyethylene glycol (n=5-100) monoacrylate, and methoxypolyethylene glycol (n=5-100) monoacrylate. Specific examples of commercially-available products of such monomers include, but are not limited to, BLEMMER® AME-100 (available from NOF CORPORATION), BLEMMER® PME-100 (available from NOF CORPORATION), BLEMMER® PME-200 (available from NOF CORPORATION), BLEMMER® PME-400 (available from NOF CORPORATION), BLEMMER® PME-1000 (available from NOF CORPORATION), and BLEMMER® PME-4000 (available from NOF CORPORATION). The content of the structural unit represented by the formula (1) in the resin particle depends on the blending amount of the monomer.

Preferably, the content rate of solid contents of the resin particle in the pretreatment liquid is in the range of from 0.5% to 30% by mass, more preferably from 5% to 20% by mass, based on total mass of the pretreatment liquid. When the content rate of solid contents is 0.5% by mass or more, the pretreatment liquid can sufficiently coats a substrate, forming a uniform coating film. When the content rate of solid contents is 30% by mass or less, coatability of the pretreatment liquid is improved.

Preferably, the resin particle exhibits a glass transition temperature of from −40° C. to 0° C. in a state in which the pretreatment liquid is coated on a substrate. When the glass transition temperature is −40° C. or more, the occurrence of tacking after printing is suppressed within a part of a substrate that has been coated with the pretreatment liquid, thus improving abrasion resistance. When the glass transition temperature is 0° C. or less, the resin particle in the pretreatment liquid is softened, thereby improving adhesion property of the pretreatment liquid to media.

Preferably, the resin particle has a median diameter D50 in the range of from 40 to 300 nm, more preferably from 60 to 200 nm, and most preferably from 80 to 150 nm, when in a dispersed state. When the median diameter of the resin particle is 40 nm or more, the pretreatment liquid is suppressed from excessively thickening. When the median diameter of the resin particle is 300 nm or less, the resulting coating film is improved in transparency.

Water-Soluble Salt

The water-soluble salt accelerates ink components to quickly aggregate immediately after the ink has been impacted on a substrate, and thus suppresses the occurrence of beading. The water-soluble salt is properly selected depending on the types of ink components. Specific examples of the water-soluble salt include, but are not limited to, metal salts and oxoacid salts.

Specific preferred examples of the water-soluble salts include, but are not limited to, salts including polyvalent ions, more preferably, polyvalent metal salts, since they can effectively aggregate pigments and resin particles in the ink. Preferably, the polyvalent metal includes at least one of alkali-earth metals, such as calcium and magnesium, since they provide excellent beading suppressing effect.

Specific examples of the polyvalent metal salts include, but are not limited to, magnesium chloride, calcium chloride, magnesium nitrate, calcium nitrate, magnesium acetate, calcium acetate, zinc sulfide, aluminum chloride, and aluminum sulfate.

Specific examples of the oxoacid salts include, but are not limited to, sodium carbonate, potassium carbonate, sodium sulfate, potassium sulfate, sodium sulfite, sodium thiosulfate, sodium phosphite, and sodium silicate.

Preferably, a content rate of the water-soluble salt in the pretreatment liquid is in the range of from 0.1% to 20% by mass, more preferably from 0.5% to 10% by mass, and most preferably from 1% to 3% by mass, based on a total mass (i.e., 100% by mass) of the pretreatment liquid. When the content rate is 0.1% by mass or more, the occurrence of beading (i.e., aggregation of ink components) is suppressed when an image is formed with an ink. When the content rate is 20% by mass or less, the dried coating film is improved in strength and transparency.

Water

Preferably, a content rate of the water in the pretreatment liquid is in the range of from 10% to 90% by mass, more preferably from 20% to 60% by mass, in view of drying property of the pretreatment liquid.

The medium of the pretreatment liquid is an aqueous medium. It is possible to add other articles other than water, such as water-soluble organic solvents and surfactants.

Organic Solvent

Usable water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250° C. or less are preferable, since they can function as a wetting agent while providing good drying property.

In addition, polyol compounds having 8 or more carbon atoms and glycol ether compounds are also preferable. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; and polyol aryl ethers such as ethylene glycol monophenyl ether and ethylene glycol monobenzyl ether.

Preferably, both the pretreatment liquid and an ink, used in combination as an ink set, include at least one of 1,2-propanediol, 1,2-butanediol, and 2,3-butanediol. In this case, film formation property is improved and abrasion resistance is more improved.

Preferably, the content rate of the organic solvent in the pretreatment liquid is in the range of from 10% to 60% by mass, more preferably from 20% to 60% by mass, based on 100% by mass of the pretreatment liquid. When the content rate is 10% by mass or more, wettability to media is improved. When the content rate is 60% by mass or less, drying property is improved.

Surfactant

Usable surfactants include silicone-based surfactants, fluorine-based surfactants, ampholytic surfactants, nonionic surfactants, and anionic surfactants.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Preferably, the content rate of the surfactant in the pretreatment liquid is in the range of from 0.001% to 5% by mass, more preferably from 0.05% to 5% by mass, from the aspects of wettability and image quality.

The pretreatment liquid may further include a colorant such as a pigment and a dye.

The pretreatment liquid may further include a defoamer, a preservative, a fungicide, and/or a corrosion inhibitor.

Defoamer

Specific examples of the defoamer include, but are not limited to, silicone defoamers, polyether defoamers, and fatty acid ester defoamers. Each of these compounds can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

An ink set according to an embodiment of the present invention includes: the pretreatment liquid; and an ink including a colorant and a resin particle (hereinafter "resin particle for ink").

The ink included in the ink set is described below in detail.

Ink

The ink used in combination with the pretreatment liquid includes a colorant and the resin particle for ink. Preferably, the ink further includes an organic solvent and water. The water-soluble salt included in the pretreatment liquid aggregates the colorant and/or the resin particle for ink in the ink.

Organic Solvent

There is no specific limitation on the type of the organic solvent included in the ink, so long as the organic solvent is water-soluble. The water-soluble organic solvents exemplified above for the pretreatment liquid can be used for the ink either.

In particular, polyol compounds having 8 or more carbon atoms and glycol ether compounds, exemplified above, are capable of improving paper-permeability of the ink, which is advantageous when the ink is printed on a recording medium made of paper.

Preferably, the content rate of the organic solvent in the ink is in the range of from 10% to 60% by mass, more preferably from 20% to 60% by mass, from the aspects of drying property and discharge reliability of the ink.

Water

Preferably, the content rate of the water in the ink is in the range of from 10% to 90% by mass, more preferably from 20% to 60% by mass, from the aspects of drying property and discharge reliability of the ink.

Colorant

Specific examples of the colorant include, but are not limited to, pigments and dyes.

Usable pigments include both inorganic pigments and organic pigments. One pigment can be used alone, or two or more pigments can be used in combination. Mixed crystal pigments can also be used.

Usable pigments include black pigments, yellow pigments, magenta pigments, cyan pigments, white pigments, green pigments, orange pigments, glossy color pigments (e.g., gold pigments, silver pigments), and metallic pigments.

Specific examples of inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for solvents are preferable. In addition, resin hollow particles and inorganic hollow particles can also be used.

Specific examples of pigments used for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3, 15:4 (phthalocyanine blue), 16, 17:1, 56, 60, and 63; and C.I. Pigment Green 1, 4, 7, 8, 10, 17, 18, and 36.

Usable dyes include acid dyes, direct dyes, reactive dyes, and basic dyes. Two or more of these dyes can be used in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

Preferably, the content rate of the colorant in the ink is in the range of from 0.1% to 15% by mass, more preferably from 1% to 10% by mass, for improving image density, fixing strength, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. In this case, the pigment may be restated as a resin-covered pigment. In this case, not all the pigment particles included in the ink should be covered with a resin. It is possible that a part of the pigment particles are not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used depending on the property of the pigment.

For example, a nonionic surfactant RT-100 (product of Takemoto Oil & Fat Co., Ltd.) and sodium naphthalenesulfonate formalin condensate are preferably used as the dispersant.

One dispersant can be used alone, and two or more dispersants can be used in combination.

Pigment Dispersion

The ink can be obtained by mixing the pigment with other materials such as water and the organic solvent. The ink can also be obtained by, first, preparing a pigment dispersion by mixing the pigment with water, a pigment dispersant, etc., and thereafter mixing the pigment dispersion with other materials such as water and the organic solvent.

The pigment dispersion includes water, the pigment, the pigment dispersant, and other components, if any. The pigment is dispersed in the pigment dispersion with the adjusted particle diameter. Preferably, the pigment dispersion is prepared with a disperser.

Preferably, the pigment dispersed in the pigment dispersion has a maximum frequency particle diameter in the range of from 20 to 500 nm, more preferably from 20 to 150 nm, based on the number of pigment particles, from the aspects of dispersion stability of the pigment and discharge stability and image quality (e.g., image density) of the ink. The particle diameter of the pigment can be measured with a particle size distribution analyzer (NANOTRAC WAVE-UT151 available from MicrotracBEL Corp.).

Preferably, the content rate of the pigment in the pigment dispersion is in the range of from 0.1% to 50% by mass, more preferably from 0.1% to 30% by mass, from the aspects of discharge stability and image density.

Preferably, the pigment dispersion may be subjected to filtration using a filter or a centrifugal separator to remove coarse particles, and degassing.

Resin Particle for Ink

The ink includes a resin particle for ink. The resin particle for ink may be either the same as or different from the resin particle included in the pretreatment liquid.

Specific examples of resins included in the resin particle for ink include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

These resin particle for ink are available either synthetically or commercially.

Specific examples of the resin particle available on the market include, but are not limited to, MICROGEL E-1002 and E-5002 (styrene-acrylic resin particles, available from Nippon Paint Co., Ltd.), VONCOAT 4001 (acrylic resin particle, available from DIC Corporation), VONCOAT 5454 (styrene-acrylic resin particle, available from DIC Corporation), SAE-1014 (styrene-acrylic resin particle, available from Zeon Corporation), SAIVINOL SK-200 (acrylic resin particle, available from Saiden Chemical Industry Co., Ltd.), PRIMAL AC-22 and AC-61 (acrylic resin particle, available from Rohm and Haas Japan K.K.), NANOCRYL SBCX-2821 and 3689 (acrylic silicone resin particles, available from Toyo Ink Co., Ltd.), #3070 (methyl methacrylate polymer resin particle, available from MIKUNI COLOR LTD.), TAKELAC W-661 and W-5661 (anionic urethane resins, available from Mitsui Chemicals, Inc.), and ARROWBASE CB-1200 (cationic olefin resin, available from UNITIKA LTD.).

Preferably, the resin particle for ink includes at least one of acrylic resin, urethane resin, and polyester resin, for the purpose of improving adhesion of the ink to a coating film of the pretreatment liquid and abrasion resistance of the ink film.

The volume average particle diameter of the resin particle is not particularly limited and can be suitably selected to suit to a particular application. Preferably, the volume average particle diameter is in the range of from 10 to 1,000 nm, more preferably from 10 to 200 nm, and most preferably from 10 to 100 nm, to obtain good fixability and image hardness.

The volume average particle diameter of the resin particle can be measured with a particle size distribution analyzer (NANOTRAC WAVE-UT151 available from MicrotracBEL Corp.).

Preferably, the content rate of the resin particle in the ink is in the range of from 1% to 30% by mass, more preferably from 5% to 20% by mass, from the aspects of fixability and storage stability of the ink.

Preferably, solid contents dispersed in the ink have a maximum frequency particle diameter in the range of from 20 to 1,000 nm, more preferably from 20 to 150 nm, based on the number of solid contents, from the aspects of discharge stability and image quality (e.g., image density) of the ink. The solid contents include particles (grains) of the resin particle and the pigment. The particle diameter of the solid contents can be measured with a particle size distribution analyzer (NANOTRAC WAVE-UT151 available from MicrotracBEL Corp.).

Additive

The ink may further include a surfactant, a defoamer, a preservative, a fungicide, a corrosion inhibitor, and/or a pH adjuster, if necessary. The surfactants, defoamers, preservatives, fungicides, and corrosion inhibitors exemplified above for the pretreatment liquid can be used for the ink either.

pH Adjuster

The pH adjuster has no particular limit so long as it is capable of adjusting the pH to 7 or higher. Specific examples of such a pH adjuster include, but are not limited to, amines such as diethanolamine and triethanolamine.

Both the pretreatment liquid and the ink may be produced by dispersing or dissolving the composition mentioned above in an aqueous medium, followed by optional stirring and mixing. The stirring and mixing may be performed by a stirrer equipped with stirring blades, a magnetic stirrer, or a high-speed disperser.

The property of the ink is not particularly limited and can be suitably selected to suit to a particular application.

Preferably, the ink has a viscosity at 25° C. in the range of from 5 to 30 mPa·s, more preferably from 5 to 25 mPa·s, to improve print density and text quality and obtain good dischargeability. The viscosity can be measured at 25° C. by a rotatory viscometer (RE-80L available from Toki Sangyo Co., Ltd.) equipped with a standard cone rotor (1°34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, in terms of prevention of corrosion of metal materials contacting the ink.

In the recording method and the recording device according to some embodiments of the present invention, an aftertreatment liquid may be applied onto the ink on a recording medium.

Aftertreatment Liquid

The aftertreatment liquid has no particular limit so long as it can form a transparent layer. The aftertreatment liquid may be obtained by mixing an organic solvent, water, a resin, a surfactant, a defoamer, a pH adjuster, a preservative, a fungicide, and/or a corrosion inhibitor. The aftertreatment liquid can be applied to the entire recording area on a recording medium or only the printed area where an ink image has been formed.

Substrate (Recording Medium)

The substrate (also referred to as "recording medium") according to some embodiments of the present invention is not particularly limited. For example, plain paper, gloss paper, special paper, and cloth are usable. Also, non-permeating substrates are preferably used.

The non-permeating substrate has a surface with a low level of moisture permeability, absorptivity, and/or adsorptivity. Examples of such a non-permeating substrate include a material having a number of hollow spaces inside but not open to the exterior.

To be more quantitative, the non-permeating substrate refers to a substrate that absorbs water in an amount of 10 mL/m$^2$ or less between a contact start time and 30 msec$^{1/2}$ after the contact start, measured according to the Bristow method. Specific examples of the non-permeating substrate include, but are not limited to, plastic films such as vinyl chloride resin films, polyethylene terephthalate (PET) films, polypropylene films, polyethylene films, and polycarbonate films.

Among these non-permeating substrates, polypropylene films, polyethylene terephthalate films, and nylon films are preferable, since they can suppress the occurrence of beading.

Specific examples of polypropylene films include, but are not limited to, P-2002, P-2161, and P-4166 (all available from Toyobo Co., Ltd.); PA-20, PA-30, and PA-20W (all available from SUN•TOX Co., Ltd.); and FOA, FOS, and FOR (all available from Futamura Chemical Co., Ltd.).

Specific examples of polyethylene terephthalate films include, but are not limited to, E-5100 and E5102 (all available from Toyobo Co., Ltd.); P60 and P375 (all available from Toray Industries, Inc.); and G2, G2P2, K, and SL (all available from Teijin DuPont Films Japan Limited).

Specific examples of nylon films include, but are not limited to, HARDEN FILM N-1100, N-1102, and N-1200 (all available from Toyobo Co., Ltd.) and ON, NX, MS, and NK (all available from UNITIKA LTD.).

Recording Device and Recording Method

The recording method according to an embodiment of the present invention includes: applying the pretreatment liquid according to an embodiment of the present invention onto a substrate; and applying an ink onto the pretreatment liquid applied onto the substrate. The pretreatment liquid and the ink are included in an ink set according to an embodiment of the present invention.

The recording device according to an embodiment of the present invention forms an image using the recording method according to an embodiment of the present invention.

Figure 2:
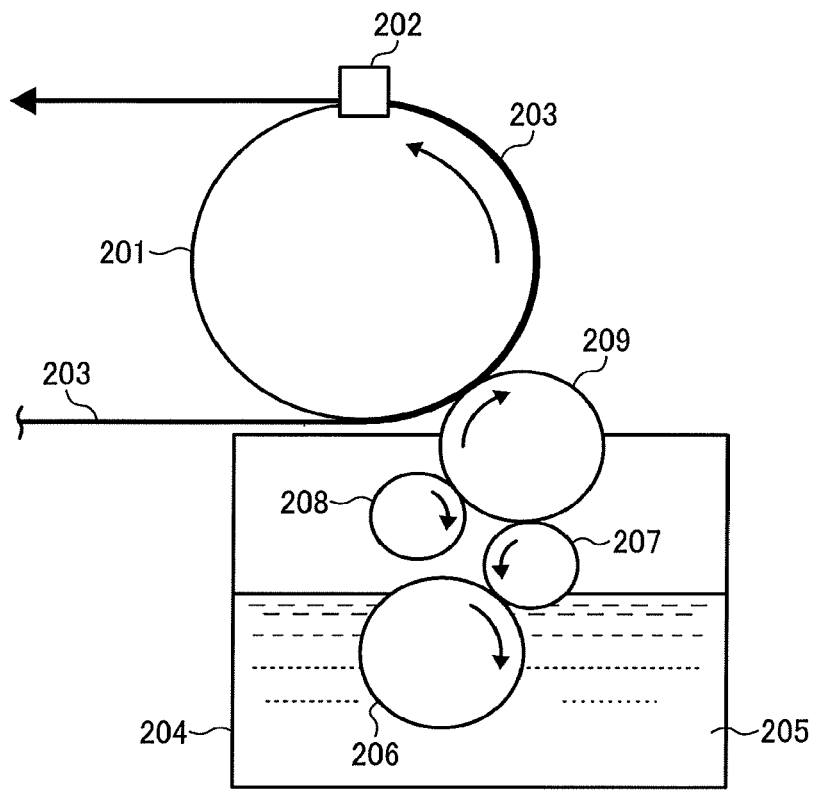
FIG. 2 is a schematic view of a pretreatment liquid applicator in a pretreatment unit in the recording device illustrated in FIG. 1.
Figure 3:
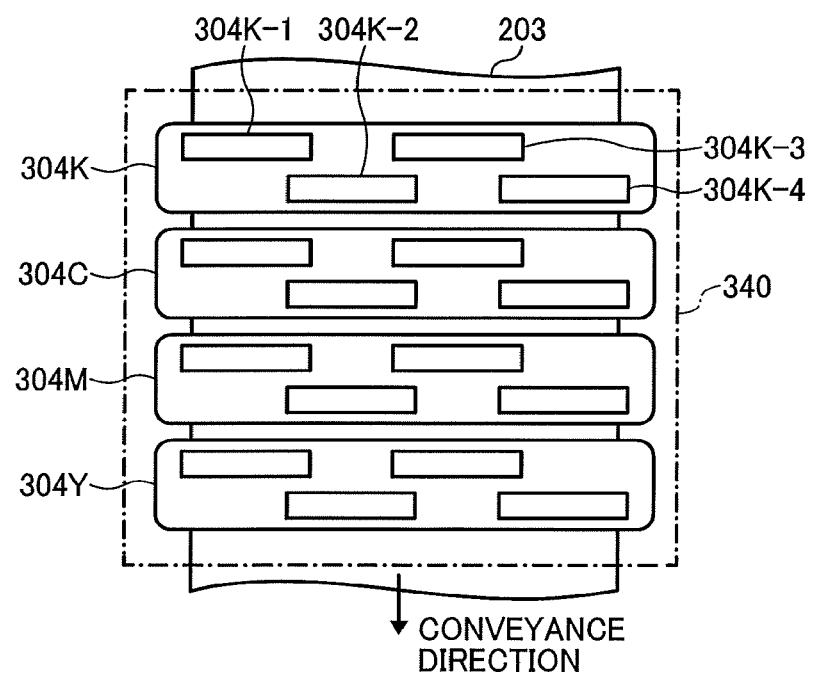
FIG. 3 is a schematic view of an inkjet head of an inkjet recording unit in the recording device illustrated in FIG. 1.
Figure 4:
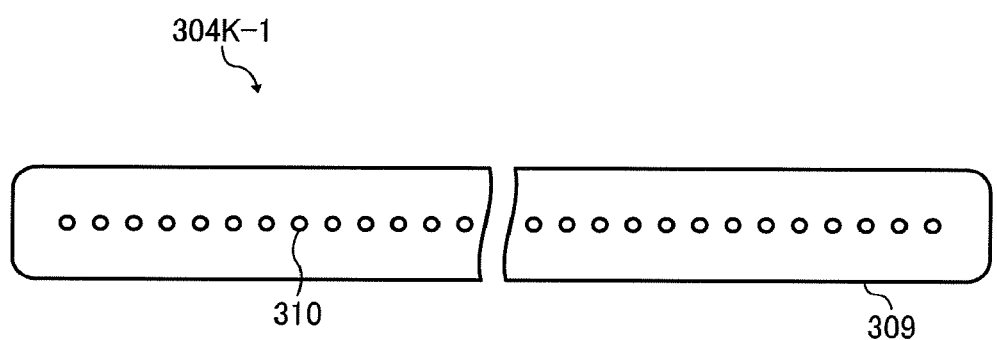
FIG. 4 is a magnified view of a head unit in the recording device illustrated in FIG. 1.

The recording device is described in detail below with reference to FIGS. 1 to 4. FIG. 1 is a schematic view of the recording device according to an embodiment of the present invention. FIG. 2 is a schematic view of a pretreatment liquid applicator in a pretreatment unit in the recording device illustrated in FIG. 1. FIG. 3 is a schematic view of an inkjet head of an inkjet recording unit in the recording device illustrated in FIG. 1. FIG. 4 is a magnified view of a head unit in the recording device illustrated in FIG. 1.

Referring to FIG. 1, a recording device 300 includes: a recording medium conveying unit 301; a pretreatment unit 302 to apply a pretreatment liquid to a recording medium 203; a first drying unit 303 to dry the recording medium 203 to which the pretreatment liquid has been applied; an inkjet recording unit 304 to form an image on the dried recording medium 203 by discharging an aqueous pigment ink thereto; an aftertreatment unit 305 to apply an aftertreatment liquid to the recording medium 203 after the image has been formed thereon; and a second drying unit 306 to dry the recording medium 203 to which the aftertreatment liquid has been applied.

The recording medium conveying unit 301 includes a sheet feeder 307, multiple conveyance rollers, and a winder 308. The recording medium 203 is in the form of continuous paper (rolled paper). The recording medium 203 is wound off from the sheet feeder 307 by the conveyance rollers and wound up by the winder 308.

In the pretreatment part 302, a pretreatment liquid is supplied from a pretreatment liquid container 204 and applied to the recording medium 203 conveyed from the recording medium conveying unit 301.

Referring to FIG. 2, a pretreatment liquid 205 is stored in the pretreatment liquid container 204. A stir-supply roller 206, a transfer roller 207, and a thin film forming roller 208 cooperatively form a thin film of the pretreatment liquid 205 on the surface of an application roller 209. The application roller 209 rotates while being pressed against a counter roller 201 that is rotating. The recording medium 203 is allowed to pass through between the application roller 209 and the counter roller 201 so that the pretreatment liquid 205 is applied to the surface of the recording medium 203. At this timing, a pressure adjuster 202 adjusts the nip pressure between the counter roller 201 and the application roller 209 to control the amount of application of the pretreatment liquid 205. The amount of application is also adjustable by adjusting the rotation speeds of the application roller 209 and the counter roller 201. The application roller 209 and the counter roller 201 are driven by a power source (e.g., driving motor). The rotation speeds of the application roller 209 and the counter roller 201 can be controlled by adjusting the power from the power source.

By using the application roller 209 to apply the pretreatment liquid 205 to the recording area of the recording medium 203, the pretreatment liquid 205 having a relatively high viscosity can be thinly applied to the recording medium 203 to further subdue occurrence of uneven coloring.

The application method of the pretreatment liquid in the pretreatment unit 302 is not limited to such roll coating. Other specific methods are, for example, blade coating, gravure coating, gravure offset coating, bar coating, and roll coating.

The pretreatment liquid 205 can be applied to the entire recording area on the recording medium 203 or only an area where an ink image is to be formed.

The recording medium 203 to which the pretreatment liquid 205 has been applied is dried by heat rollers 311 and 312 in the first drying unit 303. In particular, the recording medium 203 to which the pretreatment liquid 205 has been applied is conveyed to the heat rollers 311 and 312 by the conveyance rollers. The heat rollers 311 and 312 are generally heated to a temperature in the range of from 50° C. to 100° C. Upon contact of the heat rollers 311 and 312 with the recording medium 203 to which the pretreatment liquid 205 has been applied, heat is transmitted from the heat rollers 311 and 312 to the recording medium 203 and moisture is evaporated from the recording medium 203, thus drying the recording medium 203.

Drying members in the first drying unit 303 are not limited to heat rollers. Other examples include an infrared drier, a microwave drier, and a heat wind drier. These can be used alone or in combination.

It is also possible to heat the recording medium 203 before the pretreatment liquid 205 is applied thereto.

On the recording medium 203 thus dried, an image is formed by the inkjet recording unit 304 based on image data.

The inkjet recording unit 304 is a full-line head including four inkjet heads 304K, 304C, 304M, and 304Y of black, cyan, magenta, and yellow, respectively, arranged in this order from upstream of the conveyance direction of the recording medium 203. As illustrated in FIG. 3, the inkjet head 304K has four head units 304K-1, 304K-2, 304K-3, and 304K-4 arranged zig-zag along the direction perpendicular to the conveyance direction of the recording medium 203 to secure the recording area width of the recording medium 203. As illustrated in FIG. 4, a nozzle surface 309 of the head unit 304K-1 has multiple nozzles 310 arranged along the longitudinal direction of the head unit 304K-1 to form a nozzle array.

The nozzle array can be multiple.

The other inkjet heads 304C, 304M, and 304Y have the same configuration as the inkjet head 304K. The four inkjet heads 304K, 304C, 304M, and 304Y are arranged along the conveyance direction spaced the same distance therebetween. Thus, an image can be formed on the whole width of the entire recording area by a single recording operation.

Optionally, an aftertreatment liquid is applied by the aftertreatment unit 305 to the recording medium 203 on which an image has been formed.

The aftertreatment liquid forms a transparent protective layer on the recording medium 203 on which an image has been formed.

The aftertreatment liquid can be applied to the entire recording area on the recording medium 203 or only the printed area where an ink image has been formed.

The recording medium 203 on which an image has been formed or to which the aftertreatment liquid has been applied is dried by heat rollers 313 and 314 of the second drying unit 306 in the same manner as in the first drying unit 303.

The dried recording medium 203 is wound up by the winder 308.

It is optional to provide a pre-winding drying unit to dry the recording medium 203 before the recording medium 203 is wound up by the winder 308.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

Storage Container

A storage container according to an embodiment of the present invention includes a container and the above-described pretreatment liquid stored in the container. The storage container may further include optional members.

The container is not limited in shape, structure, size, and material.

Printed Matter

Printed matter according to an embodiment of the present invention is formed by the recording method according to an embodiment of the present invention. Specifically, the printed matter is formed by applying the pretreatment liquid according to an embodiment of the present invention onto a substrate and further applying an ink onto the pretreatment liquid applied onto the substrate, where the pretreatment liquid and the ink are included in an ink set.

EXAMPLES

Having generally described this invention, further understanding can be obtained by reference to certain specific examples which are provided herein for the purpose of illustration only and are not intended to be limiting. In the descriptions in the following examples, the numbers in parts represent mass ratios in parts, and "%" represents "% by mass", unless otherwise specified.

Preparation of Resin Particle Dispersion Liquid 1

A 1-liter flask (A) equipped with a stirrer, a thermometer, a nitrogen gas inlet pipe, and a reflux pipe was charged with 89.0 parts of ion-exchange water and heated to 70° C. while introducing nitrogen gas thereto. The flask (A) was further charged with 3.0 parts of a 10% aqueous solution of AKUARON HS-10 and 2.6 parts of a 5% aqueous solution of ammonium persulfate.

In another flask (B), 38.9 parts of methyl methacrylate, 49.6 parts of 2-ethylhexyl acrylate, 4.0 parts of polyoxyalkylene glycol monomethacrylate (n=23) (BLEMMER® PME-1000 available from NOF CORPORATION), 7.5 parts of vinyl triethoxysilane, 101.5 parts of AKUARON HS-101, and 42.9 parts of ion-exchange water were mixed with a homomixer to obtain an emulsified liquid.

The emulsified liquid in the flask (B) was continuously dropped in the flask (A) over a period of 2.5 hours. Further, 1.6 parts of a 5% aqueous solution of ammonium persulfate was dropped therein every one hour until three hours had lapsed from the start of the dropping. After the dropping was finished, the flask contents were aged at 70° C. for 2 hours, thereafter cooled, and the pH thereof was adjusted to 7 to 8 using 28% ammonia water. Thus, a resin particle dispersion liquid 1 was prepared.

Preparation of Resin Particle Dispersion Liquid 2 to 12

The procedure in preparing the resin particle dispersion liquid 1 was repeated except for changing the compositions in the flasks (A) and (B) as described in Table 1. Thus, resin particle dispersion liquids 2 to 12 were prepared.

The glass temperature of each resin particle was measured by a DSC (differential scanning calorimetry) system Q-2000 (available from TA Instruments). Specifically, each resin particle dispersion liquid was heated in an oven at 70° C. for at least 12 hours to dry. The dried solid resin in an amount of 5 mg was put in an aluminum sample container, set in the above instrument, and subjected to a measurement under nitrogen gas flow. The measuring condition was as follows. The glass transition temperature was determined from a DSC curve obtained in the second heating by a midpoint method. Evaluation results were shown in Table 1.
- (1) Cool to −70° C. and keep for 5 minutes.
- (2) Heat to 120° C. at a heating rate of 10° C./min.
- (3) Cool to −70° C. and keep for 5 minutes.
- (4) Heat to 120° C. at a heating rate of 10° C./min.

The median particle diameter (D50) of each resin particle was measured by a particle size distribution analyzer (ELSZ-1000S available from Otsuka Electronics Co., Ltd.) employing a dynamic light scattering method. Evaluation results were shown in Table 1.

Preparation of Pretreatment Liquid

Example 1

Pretreatment Liquid 1

A pretreatment liquid 1 was prepared by stir-mixing the following compounds, as listed in Table 2.
- Propylene glycol: 15 parts
- 2-Methoxy-3-methyl-1-butanol: 20 parts
- Calcium acetate monohydrate: 2 parts
- Resin particle dispersion liquid 1 (as solid contents): 10 parts
- Surfactant (TEGO (registered trademark) WET 270 available from Evonik Industries AG): 0.5 parts
- Preservative (PROXEL LV available from AVECIA GROUP): 0.05 parts
- Corrosion inhibitor (1,2,3-Benzotriazole): 0.05 parts
- Ion-exchange water: 52.4 parts Example 2

Pretreatment Liquid 2

A pretreatment liquid 2 was prepared in the same manner as the pretreatment liquid 1 except for changing the compounds as listed in Table 2.

Example 3

Pretreatment Liquid 3

A pretreatment liquid 3 was prepared in the same manner as the pretreatment liquid 1 except for changing the compounds as listed in Table 2.

Example 4

Pretreatment Liquid 4

A pretreatment liquid 4 was prepared in the same manner as the pretreatment liquid 1 except for changing the compounds as listed in Table 2.

Example 5

Pretreatment Liquid 5

A pretreatment liquid 5 was prepared in the same manner as the pretreatment liquid 1 except for changing the compounds as listed in Table 2.

Example 6

Pretreatment Liquid 6

A pretreatment liquid 6 was prepared in the same manner as the pretreatment liquid 1 except for changing the compounds as listed in Table 2.

Example 7

Pretreatment Liquid 7

A pretreatment liquid 7 was prepared in the same manner as the pretreatment liquid 1 except for changing the compounds as listed in Table 2.

Example 8

Pretreatment Liquid 8

A pretreatment liquid 8 was prepared in the same manner as the pretreatment liquid 1 except for changing the compounds as listed in Table 2.

Example 9

Pretreatment Liquid 9

A pretreatment liquid 9 was prepared in the same manner as the pretreatment liquid 1 except for changing the compounds as listed in Table 2.

Example 10

Pretreatment Liquid 10

A pretreatment liquid 10 was prepared in the same manner as the pretreatment liquid 1 except for changing the compounds as listed in Table 2.

Example 11

Pretreatment Liquid 11

A pretreatment liquid 11 was prepared in the same manner as the pretreatment liquid 1 except for changing the compounds as listed in Table 2.

Example 12

Pretreatment Liquid 12

A pretreatment liquid 12 was prepared in the same manner as the pretreatment liquid 1 except for changing the compounds as listed in Table 2.

Comparative Example 1

Pretreatment Liquid 13

A pretreatment liquid 13 was prepared in the same manner as the pretreatment liquid 1 except for changing the compounds as listed in Table 2.

Comparative Example 2

Pretreatment Liquid 14

A pretreatment liquid 14 was prepared in the same manner as the pretreatment liquid 1 except for changing the compounds as listed in Table 2.

Comparative Example 3

Pretreatment Liquid 15

A pretreatment liquid 15 was prepared in the same manner as the pretreatment liquid 1 except for changing the compounds as listed in Table 2.

Comparative Example 4

Pretreatment Liquid 16

A pretreatment liquid 16 was prepared in the same manner as the pretreatment liquid 1 except for changing the compounds as listed in Table 2.

Comparative Example 5

Pretreatment Liquid 17

A pretreatment liquid 17 was prepared in the same manner as the pretreatment liquid 1 except for changing the compounds as listed in Table 2.

Evaluation of Beading

Each pretreatment liquid was coated on a corona-discharge-treated OPP film (biaxial oriented polypropylene film PYLEN® P2161 available from Toyobo Co., Ltd.) with a bar coater (having a winding wire diameter of 0.1 mm and a capacity of deposit of 2.8 g/m$^2$) and dried at 80° C. for 2 minutes. An ink was discharged from a liquid discharger (IPSIO GXe5500 available from Ricoh Co., Ltd.) onto the above corona-discharge-treated OPP film to obtain a print sample. The print sample was visually observed to evaluate the degree of density unevenness (beading) occurred within a 3-cm-square solid image part formed of dot patterns based on the following evaluation criteria. Ranks A and B are acceptable. Evaluation results are shown in Table 2.

Evaluation Criteria

A: No density unevenness was observed.

B: Density unevenness was slightly observed, but no problem.

C: Density unevenness was clearly observed.

D: A sever degree of density unevenness was observed. (The same degree as the case in which no pretreatment liquid was coated on the OPP film.)

The ink used for the above evaluation was prepared by stir-mixing the following compounds, followed by a filtration with a 0.8-μm membrane filter (cellulose mixed ester).

Propylene glycol: 20 parts

Diethylene glycol diethyl ether: 4 parts

2-Methyl-2,4-pentanediol: 5 parts

Glycerin: 8 parts

2-Ethyl-1,3-hexanediol: 1 part

EMULGEN LS-106 (available from Kao Corporation): 1 part

PROXEL LV (available from AVECIA GROUP): 0.05 parts

KM-72F (available from Mitsui Chemicals, Inc.): 0.05 parts

TAKELAC™ W-5661 (anionic urethane resin, available from Mitsui Chemicals, Inc.): 8 parts (as solid contents)

Black pigment dispersion liquid (FUJI SP SAMPLE 8134 available from Fuji Pigment Co., Ltd.): 2.5 parts (as solid contents)

Ion-exchange water: 50.5 parts

Evaluation of Storage Stability

Each pretreatment liquid was placed in a sealed container and left to stand in a thermostatic chamber for 7 days at 40° C. and 70° C. The storage stability of the pretreatment liquid was evaluated by the rate of change of viscosity before and after the storage.

The viscosity was measured with a dynamic viscoelasticity measuring device (AR2000 RHEOMETER available from TA Instruments) at 25° C., 50% RH. The device was equipped with a cone having a diameter of 40 mm and a plate. The angle between the surface of the cone and plate was 1°. The gap between the cone and the plate was 38 μm. The shearing speed was 200 (1/s). The evaluation was determined according to the following criteria. A, B, and C are acceptable. Evaluation results are shown in Table 2.

Evaluation Criteria

A: The rate of change of viscosity was within 10%.

B: The rate of change of viscosity was greater than 10% and not greater than 20%.

C: The rate of change of viscosity was greater than 20% and not greater than 50%.

D: The rate of change of viscosity was greater than 50% or visually-observable aggregation was generated.

Evaluation of Water Resistance

Each pretreatment liquid in an amount of 5 g was placed in a petri dish made of Teflon® having a diameter of 50 mm and dried in an oven at 70° C. for 12 hours. The dried film in an amount of 0.5 g was accurately weighed, placed in a bottle with a lid along with 5 g of ion-exchange water, and left to sand at 25° C. for 12 hours. The mass of the film was weighed thereafter. The water content ratio was calculated from the following formula, plugging in the measured mass of the film before and after being dipped into the ion-exchange water.

Water content ratio (%)=(Mass after dipping (g))−(Mass before dipping (g))/((Mass before dipping (g))×100

Water resistance of the film was evaluated from the calculated water content ratio based on the following criteria. Ranks A, B, and C are acceptable. Evaluation results are shown in Table 2.

Evaluation Criteria

A: The water content was within 10%.

B: The water content was greater than 10% and not greater than 50%.

C: The water content was greater than 50% and not greater than 100%.

D: The water content was greater than 100% or the film was dissolved.

TABLE 1

| Blending amount (parts by mass) | | | Resin Perticle Dispersion Liquid 1 | Resin Perticle Dispersion Liquid 2 | Resin Perticle Dispersion Liquid 3 | Resin Perticle Dispersion Liquid 4 | Resin Perticle Dispersion Liquid 5 | Resin Perticle Dispersion Liquid 6 |
|---|---|---|---|---|---|---|---|---|
| Flask (A) | Ion-exchange water | | 89.0 | 89.0 | 89.0 | 89.0 | 89.0 | 89.0 |
| | 10% Aqueous solution of AKUARON HS-10 | | 3.0 | 3.0 | 3.0 | 3.0 | 3.0 | 3.0 |
| | 10% Aqueous solution of AKUARON RN-20 | | | | | | | |
| | 5% Aqueous solution of ammonium persulfate | | 2.6 | 2.6 | 2.6 | 2.6 | 2.6 | 2.6 |
| Flask (B) | Methyl methacrylate | | 38.9 | 20.0 | 38.9 | 40.0 | 37.2 | 20.8 |
| | 2-Ethylhexyl acrylate | | 49.6 | 14.0 | 49.6 | 50.5 | 47.3 | 14.9 |
| | Styrene | | | 62.0 | | | | 63.4 |
| | Methoxypolyethylene glycol monomethacrylate | n = 2 | | | | | | |
| | | n = 9 | | 4.0 | | | | |
| | | n = 23 | 4.0 | | | 2.0 | 8.0 | 1.0 |
| | | n = 90 | | | 4.0 | | | |
| | | n = 200 | | | | | | |
| | Vinyl triethoxysilane | | 7.5 | | 7.5 | 7.5 | 7.5 | |
| | AKUARON HS-10 | | 1.5 | 1.5 | 1.5 | 1.5 | 1.5 | 1.5 |
| | AKUARON RN-20 | | | | | | | |
| | Ion-exchange water | | 42.9 | 42.9 | 42.9 | 42.9 | 42.9 | 42.9 |
| Properties | Glass transition temperature (° C.) | | −16 | 65 | −5 | −17 | −17 | 72 |
| | Median particle diameter $D_{50}$ (nm) | | 133 | 117 | 122 | 139 | 140 | 187 |
| Blending amount (parts by mass) | | | Resin Perticle Dispersion Liquid 7 | Resin Perticle Dispersion Liquid 8 | Resin Perticle Dispersion Liquid 9 | Resin Perticle Dispersion Liquid 10 | Resin Perticle Dispersion Liquid 11 | Resin Perticle Dispersion Liquid 12 |
| Flask (A) | Ion-exchange water | | 89.0 | 89.0 | 89.0 | 89.0 | 89.0 | 89.0 |
| | 10% Aqueous solution of AKUARON HS-10 | | 3.0 | 3.0 | | 3.0 | 3.0 | 3.0 |
| | 10% Aqueous solution of AKUARON RN-20 | | | | 3.0 | | | |
| | 5% Aqueous solution of ammonium persulfate | | 2.6 | 2.6 | 2.6 | 2.6 | 2.6 | 2.6 |
| Flask (B) | Methyl methacrylate | | 20.6 | 19.3 | 40.7 | 20.0 | 38.9 | 38.9 |
| | 2-Ethylhexyl acrylate | | 14.7 | 13.8 | 51.8 | 16.0 | 49.6 | 49.6 |
| | Styrene | | 62.7 | 58.9 | | 64.0 | | |
| | Methoxypolyethylene glycol monomethacrylate | n = 2 | | | | | | |
| | | n = 9 | | | | | 4.0 | |
| | | n = 23 | 2.0 | 8.0 | | | | |
| | | n = 90 | | | | | | |
| | | n = 200 | | | | | | 4.0 |
| | Vinyl triethoxysilane | | | | 7.5 | | 7.5 | 7.5 |
| | AKUARON HS-10 | | 1.5 | 1.5 | | 1.5 | 1.5 | 1.5 |
| | AKUARON RN-20 | | | | 1.5 | | | |
| | Ion-exchange water | | 42.9 | 42.9 | 42.9 | 42.9 | 42.9 | 42.9 |
| Properties | Glass transition temperature (° C.) | | 71 | 65 | −18 | 78 | −2 | −17 |
| | Median particle diameter $D_{50}$ (nm) | | 120 | 121 | 289 | 121 | 145 | 142 |

TABLE 2

| | | Example 1 Pre-treatment liquid 1 | Example 2 Pre-treatment liquid 2 | Example 3 Pre-treatment liquid 3 | Example 4 Pre-treatment liquid 4 | Example 5 Pre-treatment liquid 5 | Example 6 Pre-treatment liquid 6 | Example 7 Pre-treatment liquid 7 | Example 8 Pre-treatment liquid 8 | Example 9 Pre-treatment liquid 9 |
|---|---|---|---|---|---|---|---|---|---|---|
| Blending amount (parts by mass) | Propylene glycol | 15 | 15 | 15 | 15 | 15 | 15 | 15 | 15 | 15 |
| | 3-Methoxy-3-methyl-1-butanol | 20 | 20 | 20 | 20 | 20 | 20 | 20 | 20 | 20 |
| | TEGO WET 270 | 0.5 | 0.5 | 0.5 | 0.5 | 0.5 | 0.5 | 0.5 | 0.5 | 0.5 |
| | PROXEL LV | 0.05 | 0.05 | 0.05 | 0.05 | 0.05 | 0.05 | 0.05 | 0.05 | 0.05 |
| | 1,2,3-Benzotriazole | 0.05 | 0.05 | 0.05 | 0.05 | 0.05 | 0.05 | 0.05 | 0.05 | 0.05 |
| | Calcium acetate monohydrate | 2 | | 2 | 2 | 2 | | | | 0.1 |
| | Magnesium chloride (anhydrous) | | 2 | | | | 2 | 2 | 2 | |

TABLE 2-continued

|  |  | Example 1 | Example 2 | Example 3 | Example 4 | Example 5 | Example 6 | Example 7 | Example 8 | Example 9 |
|---|---|---|---|---|---|---|---|---|---|---|
|  |  | Pre-treatment liquid 1 | Pre-treatment liquid 2 | Pre-treatment liquid 3 | Pre-treatment liquid 4 | Pre-treatment liquid 5 | Pre-treatment liquid 6 | Pre-treatment liquid 7 | Pre-treatment liquid 8 | Pre-treatment liquid 9 |
|  | Resin particle dispersion liquid 1 (as solid contents) | 10 |  |  |  |  |  |  |  | 10 |
|  | Resin particle dispersion liquid 2 (as solid contents) |  | 10 |  |  |  |  |  |  |  |
|  | Resin particle dispersion liquid 3 (as solid contents) |  |  | 10 |  |  |  |  |  |  |
|  | Resin particle dispersion liquid 4 (as solid contents) |  |  |  | 10 |  |  |  |  |  |
|  | Resin particle dispersion liquid 5 (as solid contents) |  |  |  |  | 10 |  |  |  |  |
|  | Resin particle dispersion liquid 6 (as solid contents) |  |  |  |  |  | 10 |  |  |  |
|  | Resin particle dispersion liquid 7 (as solid contents) |  |  |  |  |  |  | 10 |  |  |
|  | Resin particle dispersion liquid 8 (as solid contents) |  |  |  |  |  |  |  | 10 |  |
|  | Resin particle dispersion liquid 9 (as solid contents) |  |  |  |  |  |  |  |  |  |
|  | Resin particle dispersion liquid 10 (as solid contents) |  |  |  |  |  |  |  |  |  |
|  | Resin particle dispersion liquid 11 (as solid contents) |  |  |  |  |  |  |  |  |  |
|  | Resin particle dispersion liquid 12 (as solid contents) |  |  |  |  |  |  |  |  |  |
|  | Ion-exchange water | 52.4 | 52.4 | 52.4 | 52.4 | 52.4 | 52.4 | 52.4 | 52.4 | 54.3 |
| Evaluation Results | Beading | A | A | A | A | A | A | A | A | B |
|  | Storage stability at 40° C. | A | A | A | A | A | B | B | A | A |
|  | Storage stability at 70° C. | A | C | A | C | A | C | B | B | A |
|  | Water resistance | A | A | B | A | C | A | A | B | A |

|  |  | Example 10 | Example 11 | Example 12 | Comparative Example 1 | Comparative Example 2 | Comparative Example 3 | Comparative Example 4 | Comparative Example 5 |
|---|---|---|---|---|---|---|---|---|---|
|  |  | Pre-treatment liquid 10 | Pre-treatment liquid 11 | Pre-treatment liquid 12 | Pre-treatment liquid 13 | Pre-treatment liquid 14 | Pre-treatment liquid 15 | Pre-treatment liquid 16 | Pre-treatment liquid 17 |
| Blending amount (parts by mass) | Propylene glycol | 15 | 15 | 15 | 15 | 15 | 15 | 15 | 15 |
|  | 3-Methoxy-3-methyl-1-butanol | 20 | 20 | 20 | 20 | 20 | 20 | 20 | 20 |
|  | TEGO WET 270 | 0.5 | 0.5 | 0.5 | 0.5 | 0.5 | 0.5 | 0.5 | 0.5 |
|  | PROXEL LV | 0.05 | 0.05 | 0.05 | 0.05 | 0.05 | 0.05 | 0.05 | 0.05 |
|  | 1,2,3-Benzotriazole | 0.05 | 0.05 | 0.05 | 0.05 | 0.05 | 0.05 | 0.05 | 0.05 |
|  | Calcium acetate monohydrate | 1 | 3 | 20 | 2 |  | 2 | 2 |  |
|  | Magnesium chloride (anhydrous) |  |  |  |  | 2 |  |  |  |
|  | Resin particle dispersion liquid 1 (as solid contents) | 10 | 10 | 10 |  |  |  |  | 10 |
|  | Resin particle dispersion liquid 2 (as solid contents) |  |  |  |  |  |  |  |  |
|  | Resin particle dispersion liquid 3 (as solid contents) |  |  |  |  |  |  |  |  |
|  | Resin particle dispersion liquid 4 (as solid contents) |  |  |  |  |  |  |  |  |
|  | Resin particle dispersion liquid 5 (as solid contents) |  |  |  |  |  |  |  |  |
|  | Resin particle dispersion liquid 6 (as solid contents) |  |  |  |  |  |  |  |  |
|  | Resin particle dispersion liquid 7 (as solid contents) |  |  |  |  |  |  |  |  |
|  | Resin particle dispersion liquid 8 (as solid contents) |  |  |  |  |  |  |  |  |
|  | Resin particle dispersion liquid 9 (as solid contents) |  |  |  | 10 |  |  |  |  |
|  | Resin particle dispersion liquid 10 (as solid contents) |  |  |  |  | 10 |  |  |  |
|  | Resin particle dispersion liquid 11 (as solid contents) |  |  |  |  |  | 10 |  |  |
|  | Resin particle dispersion liquid 12 (as solid contents) |  |  |  |  |  |  | 10 |  |
|  | Ion-exchange water | 53.4 | 51.4 | 34.4 | 52.4 | 52.4 | 52.4 | 52.4 | 54.4 |
| Evaluation Results | Beading | B | A | A | A | A | A | A | D |
|  | Storage stability at 40° C. | A | B | C | D | D | D | A | A |

TABLE 2-continued

| | | | | | | | | |
|---|---|---|---|---|---|---|---|---|
| Storage stability at 70° C. | B | B | C | D | D | D | A | A |
| Water resistance | A | A | A | A | A | A | D | A |

It is clear from Tables 1 and 2 that the pretreatment liquids according to some embodiments of the present invention are capable of suppressing the occurrence of beading in printed images, have excellent water resistance and storage stability for an extended period of time even in the presence of water-soluble salts.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A surface treatment liquid composition, comprising:
a water-soluble salt;
water; and
a resin particle including a first resin having a structural unit represented by the formula (1):

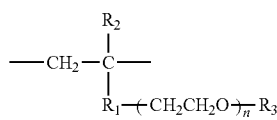

Formula (1)

where $R_1$ represents —COO—; each of $R_2$ and $R_3$ independently represents a hydrogen atom or an alkyl group having 1 to 4 carbon atoms; and n represents an integer of from 5 to 100, and at least one second resin selected from the group consisting of an urethane resin and a polyester resin.

2. The surface treatment liquid composition of claim 1, wherein n in the formula (1) represents an integer of from 10 to 50.

3. The surface treatment liquid composition of claim 1, wherein the resin particle further includes:
a monomer unit derived from a monomer; and
a cross-linked unit derived from a cross-linker,
wherein a mass ratio of the structural unit represented by the formula (1) to a total mass of the monomer unit and the cross-linked unit is in the range of from 1% to 20% by mass.

4. The surface treatment liquid composition of claim 1, wherein a content rate of the water-soluble salt in the surface treatment liquid composition is in the range of from 0.1% to 20% by mass.

5. The surface treatment liquid composition of claim 1, wherein the resin particle has a glass transition temperature of from −40° C. to 0° C.

6. An ink set comprising:
the surface treatment liquid composition of claim 1; and
an ink including a colorant and a resin particle for ink.

7. A recording method comprising:
applying a surface treatment liquid composition onto a substrate; and
applying an ink onto the surface treatment liquid composition applied onto the substrate,
wherein the surface treatment liquid composition and the ink are included in the ink set of claim 6.

8. A recording device comprising:
a surface treatment liquid composition applicator to apply a surface treatment liquid composition onto a substrate; and
an ink applicator to apply an ink onto the surface treatment liquid composition applied onto the substrate,
wherein the surface treatment liquid composition and the ink are included in the ink set of claim 6.

9. A storage container comprising:
a container; and
the surface treatment liquid composition of claim 1 stored in the container.

10. Printed matter comprising:
a substrate onto which the surface treatment liquid composition of claim 1 is applied; and
an image formed with the ink on the substrate.

11. The surface treatment liquid composition of claim 1, wherein the resin particle further includes a third resin which is an acrylic resin.

12. The surface treatment liquid composition of claim 2, wherein the resin particle further includes:
a monomer unit derived from a monomer; and
a cross-linked unit derived from a cross-linker,
wherein a mass ratio of the structural unit represented by the formula (1) to a total mass of the monomer unit and the cross-linked unit is in the range of from 1% to 20% by mass.

13. The surface treatment liquid composition of claim 2, wherein a content rate of the water-soluble salt in the surface treatment liquid composition is in the range of from 0.1% to 20% by mass.

14. The surface treatment liquid composition of claim 2, wherein the resin particle has a glass transition temperature of from −40° C. to 0° C.

15. The surface treatment liquid composition of claim 3, wherein a content rate of the water-soluble salt in the surface treatment liquid composition is in the range of from 0.1% to 20% by mass.

16. The surface treatment liquid composition of claim 3, wherein the resin particle has a glass transition temperature of from −40° C. to 0° C.

17. The surface treatment liquid composition of claim 4, wherein the resin particle has a glass transition temperature of from −40° C. to 0° C.

18. An ink set comprising:
the surface treatment liquid composition of claim 2; and
an ink including a colorant and a resin particle for ink.

19. An ink set comprising:
the surface treatment liquid composition of claim 3; and
an ink including a colorant and a resin particle for ink.

20. An ink set comprising:
the surface treatment liquid composition of claim 4; and
an ink including a colorant and a resin particle for ink.

* * * * *